Patented Dec. 5, 1939

2,182,211

UNITED STATES PATENT OFFICE 2,182,211

PREPARATION OF SAUSAGE

Levi Scott Paddock, Chicago, Ill., assignor to Industrial Patents Corporation, Chicago, Ill., a corporation of Delaware No Drawing. Application November 21, 1936,
Serial No. 112,075

5 Claims. (Cl. 99—109)

This invention relates to the preparation of casingless sausage.

One of the objects of the invention is to provide a method for the preparation of casingless sausage.

Another object of the invention is to provide a method for the continuous preparation of casingless pork sausage suitable for smoking, cooking, canning, and the like.

Other objects of the invention will be apparent from the description and claims which follow.

An expensive item in the manufacture of sausage of the domestic type is the cost of casings. For purposes of illustration, but not by way of limitation, the invention will be described as applied to the preparation of casingless frankfurters and fresh pork sausage.

Fresh pork sausage is prepared from comminuted pork trimmings appropriately spiced and seasoned. In the preparation of fresh pork sausage in link form it is customary to employ sheep casings which are tender and readily eaten with the meat. Divers methods have been suggested from time to time for the preparation of casingless pork sausage in link form to provide a product appropriate for canning. It has been proposed to cook the sausage in oil or in molds, and it has been proposed to set the sausage meat in cylindrical form by subjecting the meat in molds to low temperatures. Methods of this type require the use of molds with the consequent problems of expense and sanitation.

The present invention provides a method for the preparation of sausages in link form without the use of molds, the individual sausages produced having sufficient mechanical strength to withstand the handling incident to smoking, cooking, canning, and the like.

In carrying out the present invention any conventional stuffing horn may be employed. The present invention contemplates the passing of chopped meat through a stuffing horn which is not provided with a casing, but which is heated to a temperature such that the outside surface of the ribbon or rod of meat as it is being formed is subjected to the action of the heat and the proteins on the outside surface precipitate and coagulate to form a thin crust or integral casing. The forming tube may be heated by a steam jacket or by means of a suitable electrical heating element. With frankfurter meat the preferred temperature is approximately 212° Fahrenheit. The temperature of the forming tube may be varied to control the extent of protein precipitated and coagulated on the surface of the formed sausage. Similarly, the speed of the passage of meat through the tube may be varied for the same purpose.

It will be seen that the present invention provides a convenient, novel, inexpensive method for preparing casingless sausage. Since an ordinary sausage stuffing device may be used as a source of pressure, the character of the product may be definitely controlled and is ready for canning, smoking, or the like immediately upon discharge from the sausage forming machine. The present invention, therefore, eliminates the costly steps subsequent to formation of the sausage which have been heretofore considered necessary in the preparation of casingless sausage of sufficient mechanical strength to withstand the handling incident to smoking, cooking, canning, or the like.

The present invention contemplates the extrusion of sausage meat in relatively long lengths which may then be subdivided into shorter lengths or links for subsequent handling.

I claim:
1. The method of preparing casingless sausage which comprises extruding sausage meat through a heated forming tube.
2. The method of preparing casingless sausage which comprises simultaneously forming sausage meat and applying heat to the surface thereof.
3. The method of preparing casingless sausage which comprises continuously forming sausage meat and applying heat to the surface thereof at the point of formation.
4. The method of preparing casingless sausage which comprises continuously forming sausage meat and simultaneously heating the surface of the meat at the point of formation to a temperature of approximately 212° Fahrenheit.
5. The method of preparing casingless sausage which comprises forming sausage meat in continuous lengths, applying heat to the surface thereof at the point of formation and thereafter dividing into links.

LEVI SCOTT PADDOCK.